(12) United States Patent
Hankin, Jr. et al.

(10) Patent No.: US 6,729,602 B2
(45) Date of Patent: May 4, 2004

(54) ADJUSTABLE STOP APPARATUS

(75) Inventors: Alon G S Hankin, Jr., Solihull (GB); Robert P Jones, Jr., Solihull (GB)

(73) Assignee: Lucas Industries Limited (GB)

( * ) Notice: Subject to any disclaimer, the term of this patent is extended or adjusted under 35 U.S.C. 154(b) by 198 days.

(21) Appl. No.: 10/000,513

(22) Filed: Oct. 23, 2001

(65) Prior Publication Data
US 2002/0047102 A1 Apr. 25, 2002

(30) Foreign Application Priority Data
Oct. 25, 2000 (GB) .............................. 0026061

(51) Int. Cl.⁷ .............................................. F16K 51/00
(52) U.S. Cl. ...................................................... 251/285
(58) Field of Search ........................................ 251/285

(56) References Cited

U.S. PATENT DOCUMENTS 3,397,863 A * 8/1968 Bell ........................... 251/285
4,342,443 A * 8/1982 Wakeman ............... 251/129.08
5,971,359 A * 10/1999 Niakan et al. ............... 251/288

FOREIGN PATENT DOCUMENTS

| EP | 0 666 521 A | 8/1995 |
|---|---|---|
| FR | 845 170 A | 8/1999 |
| GB | 757 779 A | 9/1956 |

* cited by examiner

Primary Examiner—Edward K. Look
Assistant Examiner—John K. Fristoe, Jr.
(74) Attorney, Agent, or Firm—Andrus, Sceales, Starke & Sawall, LLP

(57) ABSTRACT

An adjustable stop apparatus for limiting movement of an element of a metering valve for setting a flow limit condition of the valve, the apparatus comprising a stop, a housing, a rotary adjuster device connected to the stop for adjustably positioning the stop relative to the housing, and a guide device operable to guide and secure the adjuster device relative to the housing into any one of a plurality of pre-set positions determined by the guide device.

11 Claims, 3 Drawing Sheets

ADJUSTABLE STOP APPARATUS

BACKGROUND OF THE INVENTION

The invention relates to an adjustable stop apparatus for limiting movement of an element of a metering valve for setting a flow limit condition of the valve.

An adjustable stop apparatus for a metering valve is known comprising a stop S, a housing H, and a rotary adjuster device D connected to the stop S. Such a device is shown in FIG. 1 fitted to a metering valve. The position of the stop S is normally adjusted by means of the rotary adjuster device D in a factory environment during assembly of the valve, and die rotary adjuster device D is then locked in position with a lock nut N. The valve user would not be expected to carry out further adjustments to the position of the stop S of the known device. Therefore, a tamper resistant cover C is generally fitted to the stop apparatus covering the lock nut N.

BRIEF SUMMARY OF THE INVENTION

In accordance with the invention, an adjustable stop apparatus is provided for limiting movement of an element of a metering valve for setting a flow limit condition of the valve, the apparatus comprising a stop, a housing, a rotary adjuster device connected to the stop for adjustably positioning the stop relative to the housing, and a guide device operable to guide the adjuster device relative to the housing into a plurality of alternative preset positions determined by the guide device.

This provides the facility for a user to switch between pre-set positions without necessitating any variable adjustments or precision setting techniques. In his manner, a single stop apparatus can be kept by a user and adjusted by the user to provide a variety of different flow limit conditions according to requirement. This obviates the need to store several stop apparatuses for different requirements.

Preferably, the guide device releasably secures the adjuster device relative to the housing in said pre-set positions.

The guide device conveniently comprises a sleeve having a plurality of slots, each slot corresponding to a respective one of set pre-set positions and being selectively alignable with a projection fixed relative to the housing.

Rotary movement of the adjuster may be permitted by the guide device only within a selected arc between said pre-set positions. This helps prevent confusion when re-positioning the stop, and prevents the adjuster device being turned beyond said pre-set positions resulting in an undesirable stop position.

Conveniently, a peripheral portion of the sleeve is extended axially beyond the rest of the sleeve to provide a lug which limits the extent of rotary movement of the guide device in its released condition.

Preferably, the apparatus further comprises resilient biasing means biasing the guide device in a direction tending to secure the adjuster device relative to the housing.

The biasing means may comprise a spring disposed within the guide device and acting between an abutment fixed relative to the adjuster device and a laterally inwardly extending portion of the guide device.

Conveniently, the guide device has an external groove or projection for engagement by a tool, for placing the guide device in a released condition in which the adjuster device is movable relative to the housing, and the housing has a correspondingly positioned access aperture for accessing the groove or projection with the tool.

Markings may be provided on the guide device for indicating a present position of the guide device, the markings being viewable through the access aperture The markings may include a triangle arranged to indicate, in use, in which direction the guide device should be moved to obtain a greater or lesser flow limit condition of the metering valve.

The guide device may have a flat sided portion for engagement by a rotary tool, the arrangement being such that the flat sided portion projects from the housing for access by the rotary tool only when the guide device is in the released condition.

BRIEF DESCRIPTION OF THE DRAWINGS

In order that the invention may be better understood, an embodiment thereof will now be described, by way of example only, with reference to the accompanying drawings, in which.

DETAILED DESCRIPTION OF THE INVENTION

Figure 1:
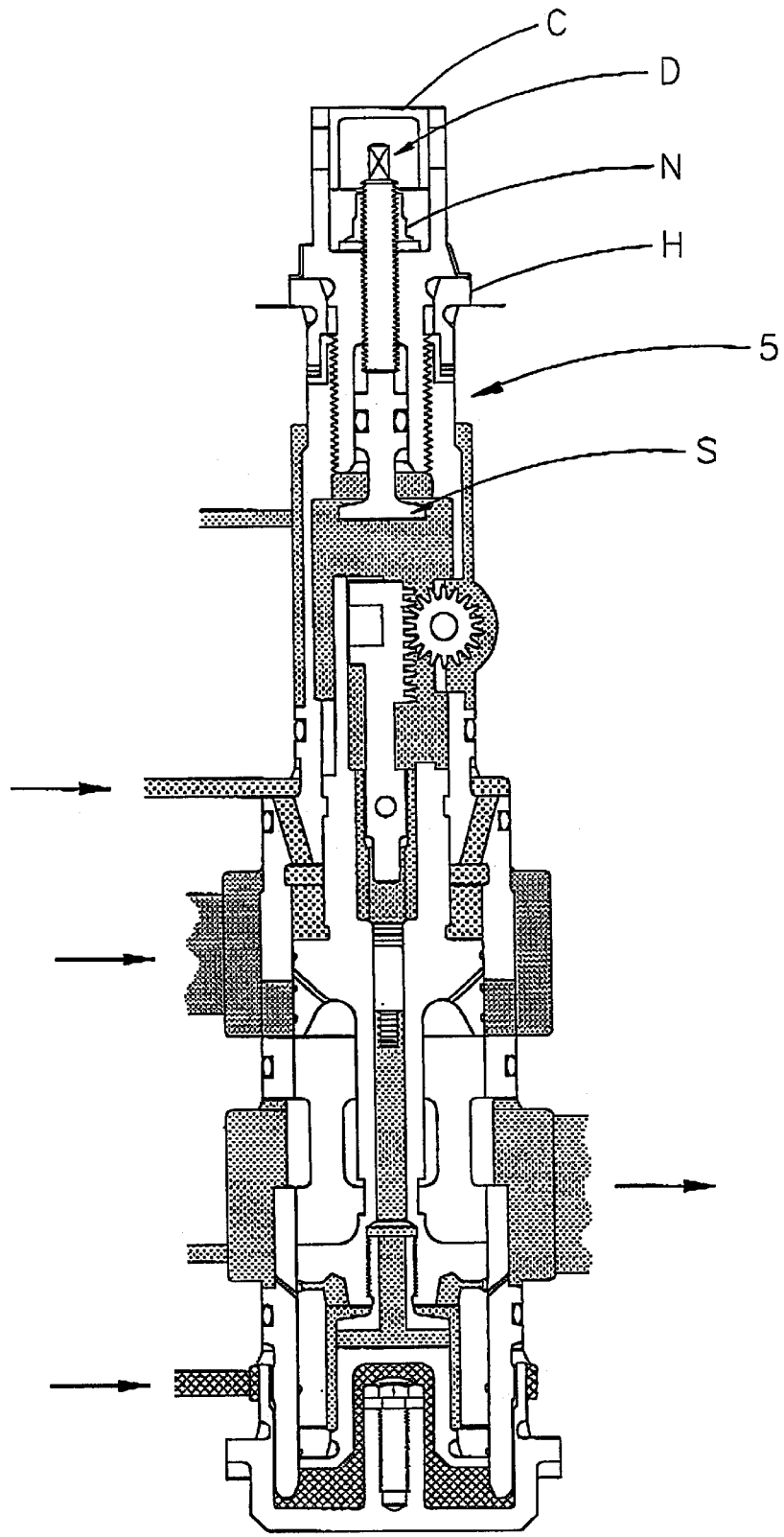
FIG. 1 shows a known adjustable stop apparatus fitted to a metering valve.
Figure 3:
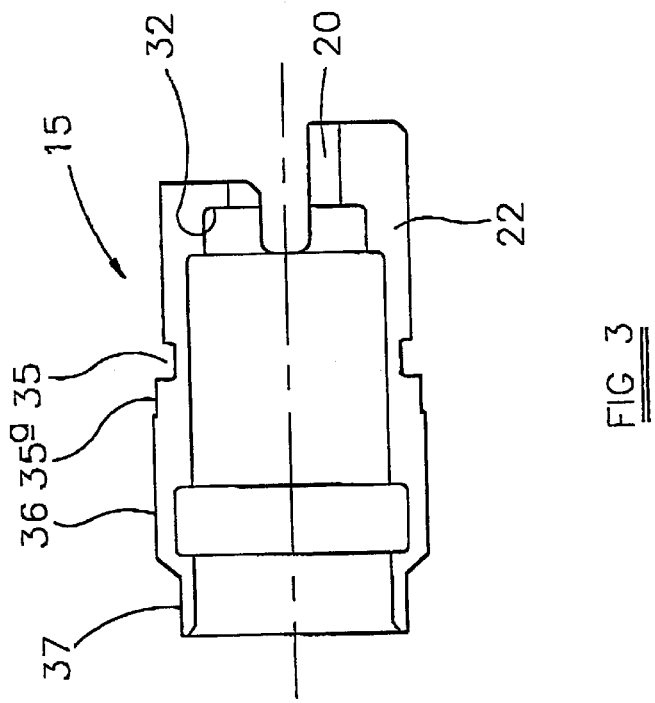
FIG. 3 is an enlarged view of a sleeve of the apparatus shown in FIG. 2.
Figure 2:
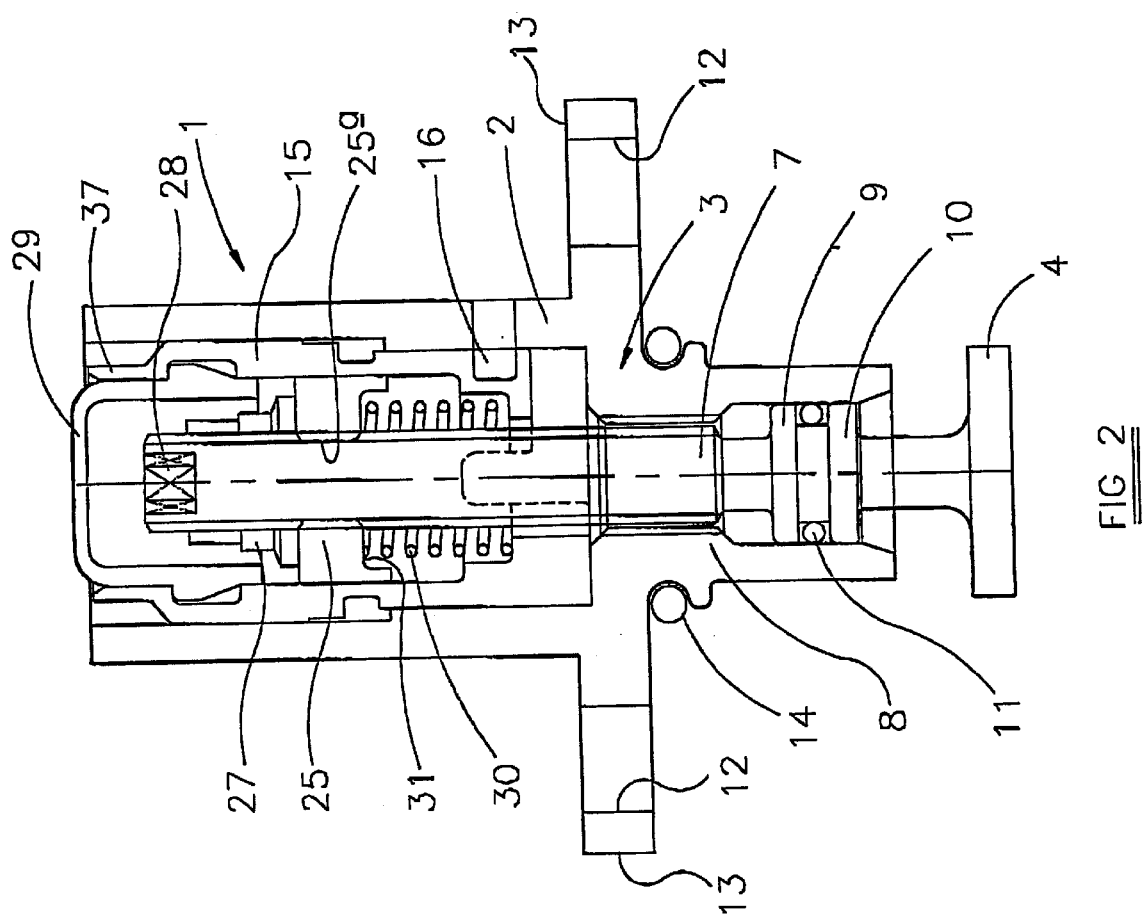
FIG. 2 shows an adjustable stop apparatus in accordance with the invention.

FIG. 2 shows an adjustable stop apparatus 1 having a housing 2, a rotary adjuster device 3, and a stop 4 connected to the rotary adjuster device 3. The apparatus can be mounted, in use, to a metering valve such as the metering valve shown in FIG. 1 for supplying fuel to an engine. As with the known adjustable stop apparatus 5 shown in FIG. 1, the stop S can be used for limiting movement of an element of the metering valve for setting a flow limit condition of the valve, for example for setting a maximum flow condition.

The adjuster device 3 comprises a shaft 7 extending co-axially within the housing 2 and threadedly engaging an internally threaded portion 8 of the housing. Thus, rotation of the shaft 7 causes the adjuster device 3, and consequently the stop 4, to move axially relative to the housing 2. The adjuster device 3 is provided with two axially spaced laterally extending portions 9, 10. An 'O' ring seal 11 is housed between the laterally extending portions 9, 10 and an internal face of the housing, for preventing egress of fluid, in use, from a metering valve to which the apparatus 1 is fitted through the interface between the internally threaded portion 8 and corresponding threads on the shaft 7.

The internally threaded portion 8 comprises a wire thread insert mounted in a through bore in the housing 2, although other ways of providing the internal thread will be apparent to the skilled reader. The housing 2 may be fitted to a metering valve, in use, using bolts inserted through holes 12 in laterally extending lugs 13, and a further 'O' ring seal 14 is provided to seal between an external surface of the housing and a surface of the metering valve.

Figure 4:
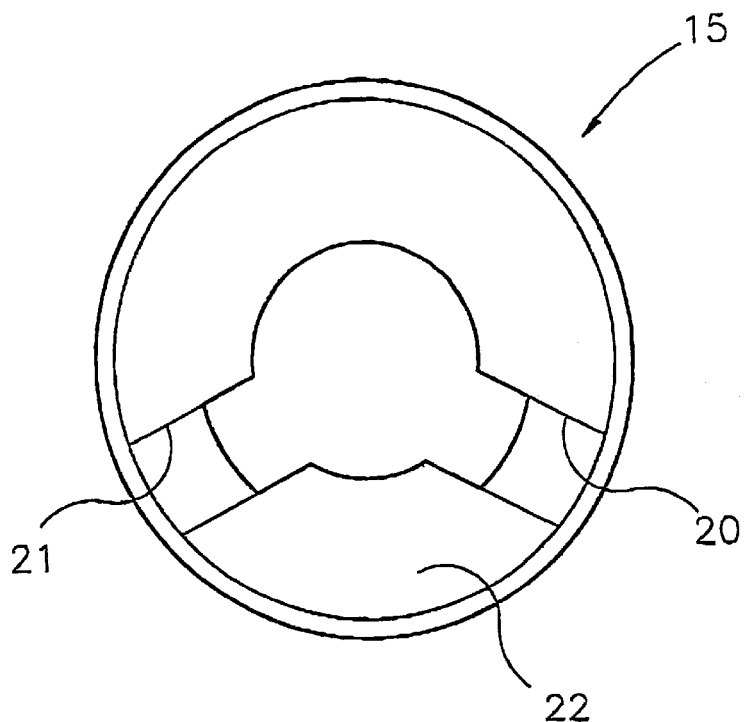
FIG. 4 is an end view of the sleeve shown in FIG. 3.
Figure 5:
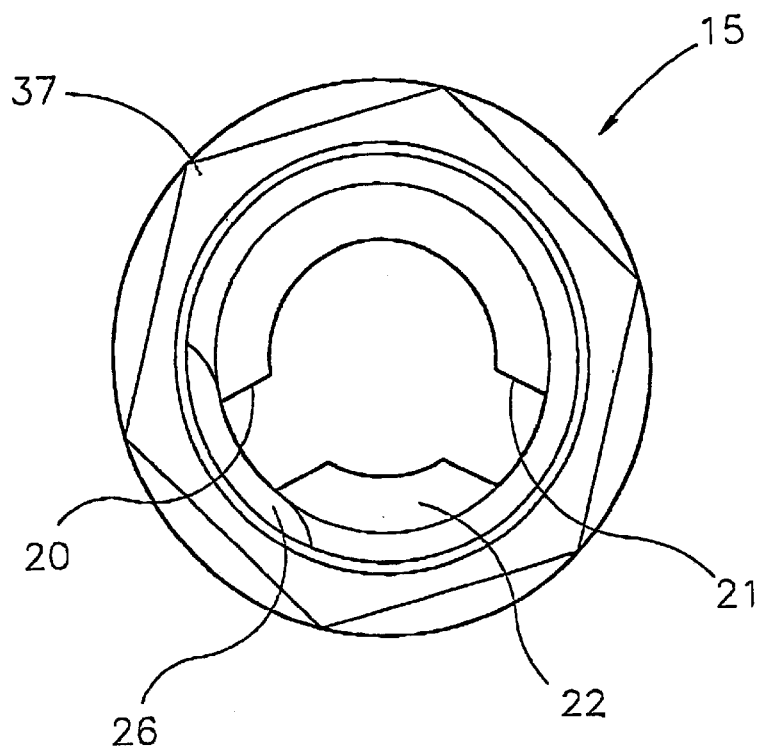
FIG. 5 is an opposite end view of the sleeve shown in FIG. 3.

A guide device is provided, in the form of a sleeve 15 and a laterally inwardly extending projection 16, for guiding the adjuster device 3 relative to the housing into alternative pre-set positions. These positions are determined by axially extending slots 20,21 (FIGS. 4 and 5) circumferentially spaced about the sleeve 15, which alternatively engage the projection 16. To engage the projection 16 with one of the slots 20, 21 the sleeve 15 must be lifted so that the previously engaged slot 20, 21 clears the projection 16. The sleeve can then be rotated relative to the housing until the next desired slot 20, 21 is aligned with the projection 16. The sleeve 15 is then moved axially to engage the desired slot 20,21 with the projection 16 to secure the adjuster device 3 relative to the housing 2.

A circumferential portion of the sleeve 15 between the slots 20, 21 is axially extended so as to provide a lug 22 which extends axially beyond the rest of the sleeve end. This lug 22 limits the extent of rotary movement of the sleeve 15, even when the slots 20,21 have been lifted to clear the projection 16. This ensures that the sleeve is not rotated beyond desired limits, whereby engagement of a slot 20,21 with the projection might result in an undesirable position of the stop device.

To ensure that the sleeve 15 is fixed for rotation with the adjuster device 3, on assembling the apparatus an abutment device 25 is inserted internally of the sleeve 15. The abutment device 25 has a through passage having internal threads 25a which threadedly engage a threaded portion of the shaft 7. The abutment device has a circumferential portion (not shown) which is contoured to engage a laterally inwardly extending projection 26 (FIG. 5) of the sleeve 15 to prevent rotation of the abutment device relative to the sleeve 25. The abutment device 25 is secured in position axially on he shaft 7 by a lock nut 27.

Following assembly of the apparatus 1, it is possible to carry out infinitely variable adjustments to the position of stop 4 by releasing the lock nut 27 and rotating the adjuster device by means of internally recessed flats 28 in the end of the shaft 7. However, whilst it is envisaged that such variable adjustments can be carried out in a factory environment, it is not desirable that a customer using the apparatus 1 should carry out its own adjustments. A tamper-proof cover 29 is provided to indicate if any tampering has occurred which might result in any such variable adjustment. Provision of the recessed flats 28 in the shaft 7 assists in keeping the overall length of the assembly 1 to a minimum. The tamper-proof cover 29 ensures the integrity of the factory adjusted datum settings. In order further to ensure that the valve is not switched between datum settings in use, it is proposed to wire in place the spring latch which holds the cover 29 in the sleeve 15.

A resilient biasing means is provided in the form of a helical spring 30 for biasing the sleeve 15 in a direction tending to secure the slot 20 or 21 in engagement with the projection 16. One end of the spring 30 abuts a laterally inwardly extending end surface 32 of the sleeve 15 and the other end of the spring 30 abuts a laterally inwardly extending surface 31 of the abutment device 25. The length of the spring 30 when filly compressed limits lifting of the sleeve 15 such that the free end of the lug 22 cannot clear the projection 16.

To release the slot 20 or 21 from engagement with projection 16, it is necessary to lift the sleeve 15 against the biasing force of the spring 30 until the slot clears the projection. The lug 22 acting against projection 16 ensures that the sleeve 15 can only be turned in one direction to align the other of the slots 20,21 with the projection 16. Sleeve 15 can then be let go to allow the biasing force of the spring 30 to move the sleeve 15 such that the newly aligned slot 20 or 21 engages with the projection 16 so as to secure the adjuster device 25 relative to the housing with the stop 4 in a desired pre-set position.

To facilitate lifting the sleeve 15 against tile biasing force of the spring 30, a groove 35 is provided externally of the sleeve 15. An access aperture or window (not shown) is provided in the housing 2 to provide access by a tool, for example a screwdriver, to tie groove 35. A portion 35a of the sleeve 25 axially adjacent the groove 35 has a slightly reduced outer diameter, so that any slight burrs caused to the portion 35a by engaging the groove 35 with a tool do not hinder free movement of the sleeve 15 relative to the housing 2.

Markings (not shown) may be provided on an external surface 36 of the sleeve 15 which are visible through the aperture or window (not shown). The markings may comprise respective letters which are fully visible when a respective one of the slots 20, 21 is fully engaged with the projection 16. The markings may also comprise a triangle disposed between the letters, indicating whether the change of position being effected will result in a greater or lesser maximum flow condition of the metering valve to which the apparatus 1 is to be fitted.

The sleeve 15 has external flats 37 provided at one end thereof which extend axially from the housing 2 only when the sleeve 15 has been fully lifted against the biasing force of the spring 30. In this condition, the flats 37 can be engaged by a tool to assist in turning the sleeve 15 to the other preset position. The projection 16 may be a pin brazed to the housing 2.

It should be apparent that the apparatus 1 allows the position of the stop 4 to be adjusted with the apparatus 1 fitted to a metering valve, without removing components from the metering valve. This facility is useful in practice in preventing internal contamination of the metering valve during adjustment between the two maximum flow settings.

It will also be apparent that more tan two preset positions of the stop 4 can be provided if desired.

What is claimed is:

1. An adjustable stop apparatus for limiting movement of an element of a metering valve for setting a flow limit condition of the valve, the apparatus comprising, a housing; an adjuster in screw-threaded engagement with said housing; a stop carried by said adjuster and cooperable in use with said element of said metering valve, whereby rotation of said adjuster relative to said housing moves said adjuster and said stop axially relative to said housing and thereby enables a fine adjustment of the axial position of said stop relative to said housing; a guide device mounted for rotational movement relative to said housing between predefined rotated positions in relation to said housing; and, coupling means coupling said guide device to said adjuster whereby movement of said guide device relative to said housing from one of said predetermined positions to a second of said predetermined positions moves said stop axially through a predetermined distance relative to said housing.

2. An apparatus as claimed in claim 1, wherein the guide device releasably secures the adjuster device relative to the housing in said pre-set position.

3. An apparatus as claimed in claim 2, wherein the guide device is movable axially relative to said housing between a set position and a released position.

4. An apparatus as claimed in claim 3, further comprising resilient biasing means biasing the guide device in an axial direction to said set position to secure the adjuster relative to the housing.

5. An apparatus as claimed in claim 4, wherein the biasing means comprises a spring disposed within the guide device and acting between an abutment fixed relative to the adjuster and a laterally inwardly extending portion of the guide device.

6. An apparatus as claimed in claim 2, wherein the guide device has an external groove or projection for engagement by a tool for placing the guide device in a released condition, for releasing the adjuster relative to the housing, and the housing has a correspondingly positioned access aperture for accessing the groove or projection.

7. An apparatus as claimed in claim 2, wherein the guide device has a flat sided portion for engagement by a rotary tool for adjusting the position of the stop, the arrangement being such that the flat sided portion projects from the housing for access by the rotary tool only when the guide device is in the released condition.

8. An apparatus as claimed in claim 2, including indicia denoting the position of the guide device and/or the direction of movement of the guide device necessary to achieve a particular flow condition in use.

9. An apparatus as claimed in claim 1, wherein the guide device comprises a sleeve having a plurality of slots, each slot corresponding to a respective one of said pre-set positions and being selectively alignable with a projection fixed relative to the housing.

10. An apparatus as claimed in claim 9, wherein a peripheral portion of the sleeve is extended axially beyond the rest of the sleeve to form a lug which limits the extent of rotary movement of the guide device.

11. An apparatus as claimed in claim 1, wherein rotary movement of the adjuster with said guide device is permitted by the guide device only within a selected arc between said pre-set positions.

* * * * *